(12) United States Patent
Kimura et al.

(10) Patent No.: US 6,477,345 B2
(45) Date of Patent: Nov. 5, 2002

(54) COMPACT IMAGE FORMING APPARATUS (75) Inventors: Naomasa Kimura, Ibaraki-ken; Yoshiyuki Koshimizu, Abiko; Masakazu Mori; Hideki Mori, both of Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/774,697

(22) Filed: Feb. 1, 2001

(65) Prior Publication Data

US 2001/0014231 A1 Aug. 16, 2001

(30) Foreign Application Priority Data

Feb. 3, 2000 (JP) .................................. 2000-026389

(51) Int. Cl.[7] .............................................. G03G 15/00
(52) U.S. Cl. ....................................................... 399/107
(58) Field of Search .................................... 399/107, 110

(56) References Cited

U.S. PATENT DOCUMENTS 5,950,046 A * 9/1999 Goto ........................... 399/110

FOREIGN PATENT DOCUMENTS

JP           2000098287     *  4/2000

* cited by examiner

Primary Examiner—Quana M. Grainger
(74) Attorney, Agent, or Firm—Fitzpatrick, Cella, Harper & Scinto

(57) ABSTRACT

The present invention relates to an image forming apparatus comprising an original document reading means for optically reading an image on an original document; and an image forming means arranged below the original document reading means for making a recording on a recording medium corresponding to image information read by the original document reading means. The image forming means is one-sidedly arranged to one side in a longitudinal direction of the original document reading means to create a space is obtained on the opposite side.

8 Claims, 8 Drawing Sheets

COMPACT IMAGE FORMING APPARATUS

BACKGROUND OF THE INVENTION

1. Field of the Invention

This invention relates to an image forming apparatus comprising a reading means which optically reads an original document image, and an image forming means which forms images into a recording medium and, more particularly, relates to an image forming apparatus conveying the recording medium to the direction which intersects with the scanning direction of the original document scanning section of the reading means.

2. Description of Related Art

In respect of an image forming apparatus of an electro photographic method, a digital multi machine is becoming used widely. With the digital method image forming, the original document image can be read by a reading sensor e.g., CCD or the like, which converts optical information into electric signals. The read image information is sent to a control board arranged inside the main body; then processing such as A/D convertion, shading correction, density processing is applied upon by the image processing circuit; then is outputted at the printer section for recording means.

Therefore, the arrangement which includes a reader serving as an original document scanning section for optically scanning the original document and an image forming means which reproduces the original document information on the recording medium based on the original document information scanned by the reader has the characteristic of not being subject to optical restrictions.

Figure 7:
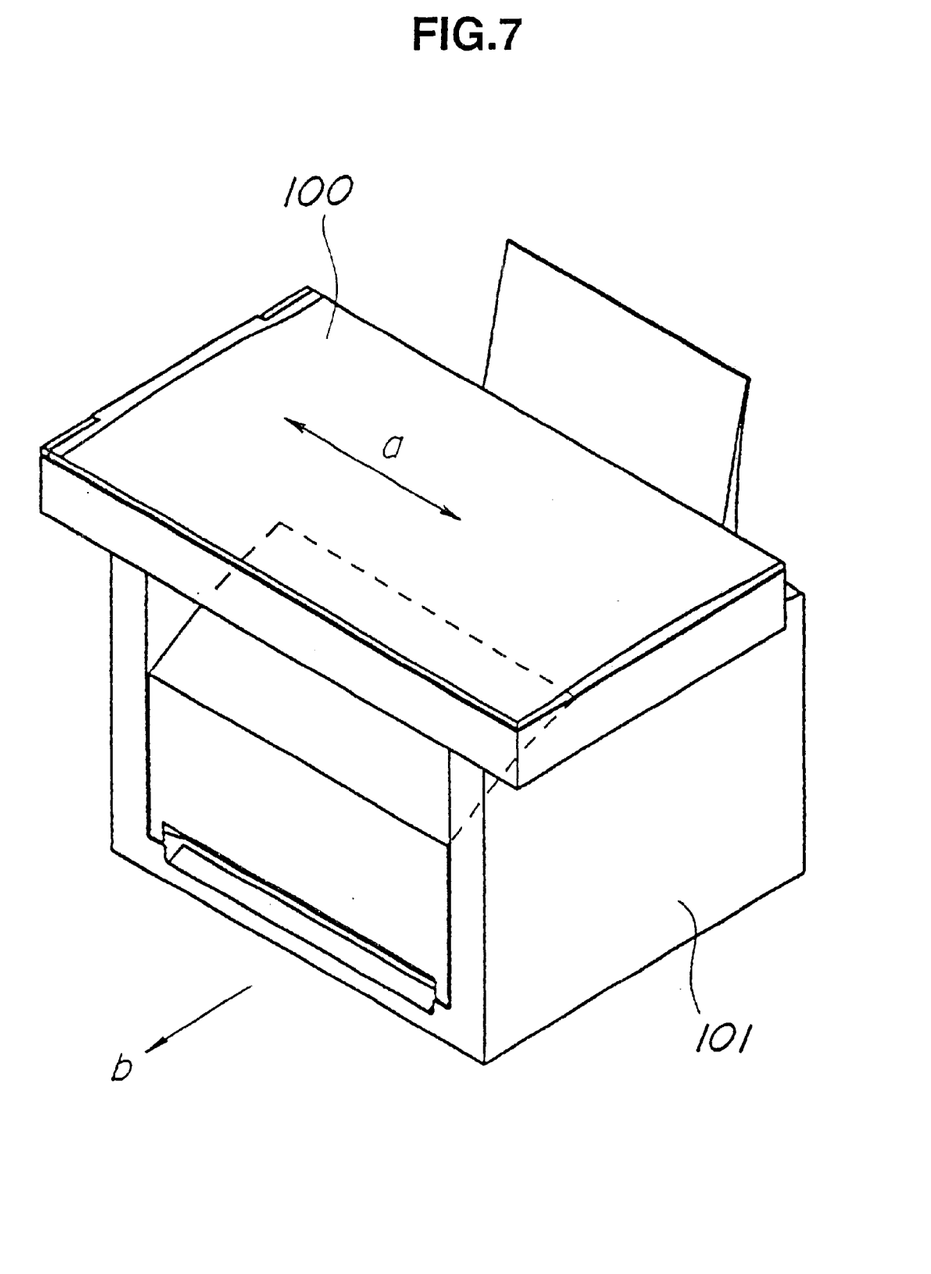
FIG. 7 is a perspective view showing a conventional image forming apparatus.
Figure 8:
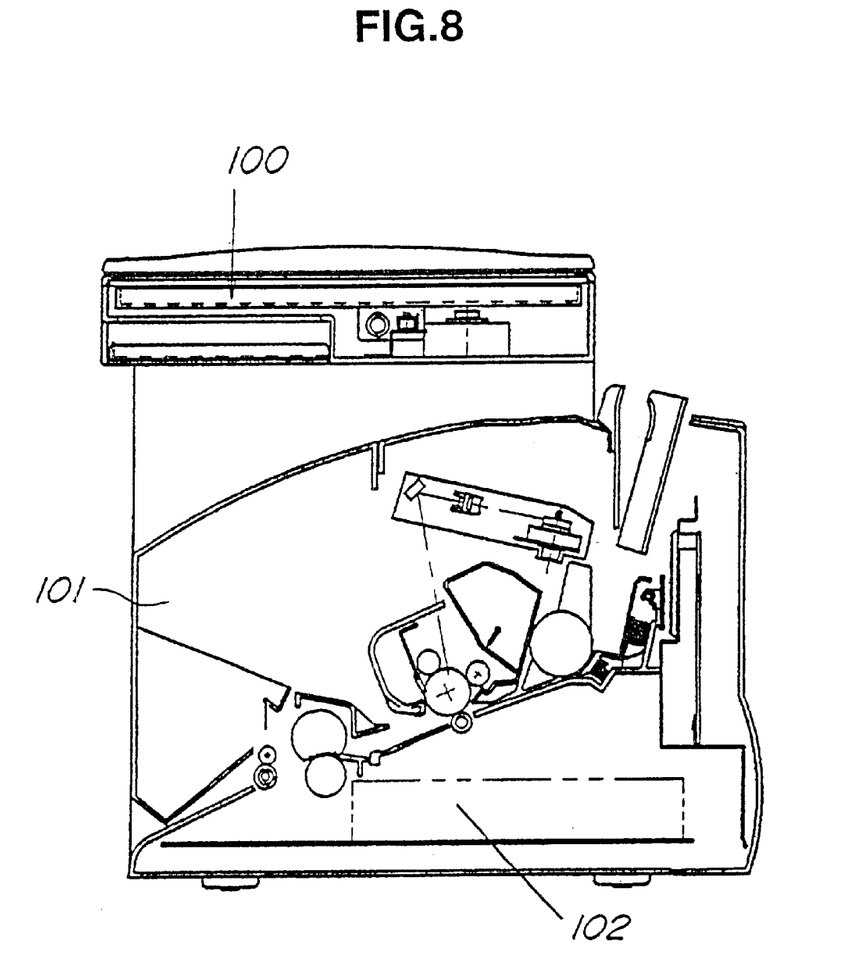
FIG. 8 is a cross-sectional view showing a conventional image forming apparatus.

The image forming apparatus utilizing the above characteristic is shown in FIG. 7 and FIG. 8. FIG. 7 is a perspective view of the image forming apparatus, and FIG. 8 is a cross section view of the image forming apparatus. As shown in the figures, the form of the image forming apparatus defined by the size of the original document is aimed to be more compact by arranging the original document reading means 100 and the image forming means 101 with a structure in which the reading/scanning direction (direction of the arrow in FIG. 7) substantially intersects perpendicularly to the conveying direction of the recording medium.

In general, as shown in FIG. 7, the position of the recording medium is arranged to cut across the substantial center of the apparatus body and taking the form in which importance is attached to the appearance of the entire layout of the apparatus.

Nevertheless, with the above-mentioned structure of the image forming apparatus, further making the form more compact raises a difficult problem. That is, in respect of the image forming apparatus of the digital method, the electrically related structural elements physically take up a large share of space. The electric composition is basically as follows:

(1) A system controller section which controls the entire multi-function and controls the command sent from an external apparatus such as a personal computer and the like;
(2) An engine controller section which manages the control of the image forming operation;
(3) An IP (image processing) section which image-processes the image information read when functioning as a photocopier;
(4) A printer driver board section; and
(5) A power circuit unit (high voltage and low voltage).

Due to the structure of the conventional example shown in FIG. 7, the space 102 for arranging such as the foregoing system controller section, engine controller section could only be disposed in the position below the recording medium conveying section 101, as shown in FIG. 8; this was a problem in terms of lowering the height of the apparatus body, Furthermore, taking the addition of the two-side recording function and the sheet feeding cassette function into consideration, in order to lower the height of the apparatus body, the arrangement of the space 102 shown in FIG. 8 was a matter of concern which needed re-evaluation.

Another advantage of the digital method is that the upgrading of performance or the upgrading function can be accomplished by connecting various function boards. That is, a variety of functions can be achieved by attaching the boards corresponding to the functions which the user needs, such as a PDL (page description language) board which can reproduce the high grade font according to the efficiency of the printer/a fax board/electro filing board/. Therefore, though a space is created due to the state in which the width of the image forming means is shorter than the longitudinal direction of the reading means, the said space could not be used effectively. In consequence, with the layout of the conventional apparatus, there was a problem that the foregoing functions could not be added without making the frame of the apparatus larger.

This invention would resolve the above mentioned problem, and the objective is to provide an image forming apparatus capable of adding supplementary functions without making the apparatus frame larger,

SUMMARY OF THIS INVENTION

The representative composition of this invention for accomplishing the foregoing objective is, an image forming apparatus having an original document reading means which optically reads the image of the original document; and an image forming means arranged below the original document reading means for making a recording on a recording medium corresponding to the image information read by the original document reading means; wherein the said image forming means is arranged to one side of the longitudinal direction of the said original document reading means, while a space is obtained on the other side.

With the foregoing structure, the space except for the space taken up by the image forming means arranged below the reading means can be effectively obtained, and since the obtained space is of sufficient capacity, the equipping of useful boards and the like is made possible. Consequently, the addition of supplementary functions can be achieved without making the apparatus layout larger.

BRIEF DESCRIPTION OF THE DRAWINGS

The above and other objects and features of the invention are apparent to those skilled in the art from the following preferred embodiments thereof when considered in conjunction with the accompanied drawings, in which.

DESCRIPTION OF THE PREFERRED EMBODIMENTS

An embodiment of the image forming apparatus of regarding this invention will hereinafter be described with reference to the drawings.

First Embodiment

Figure 1:
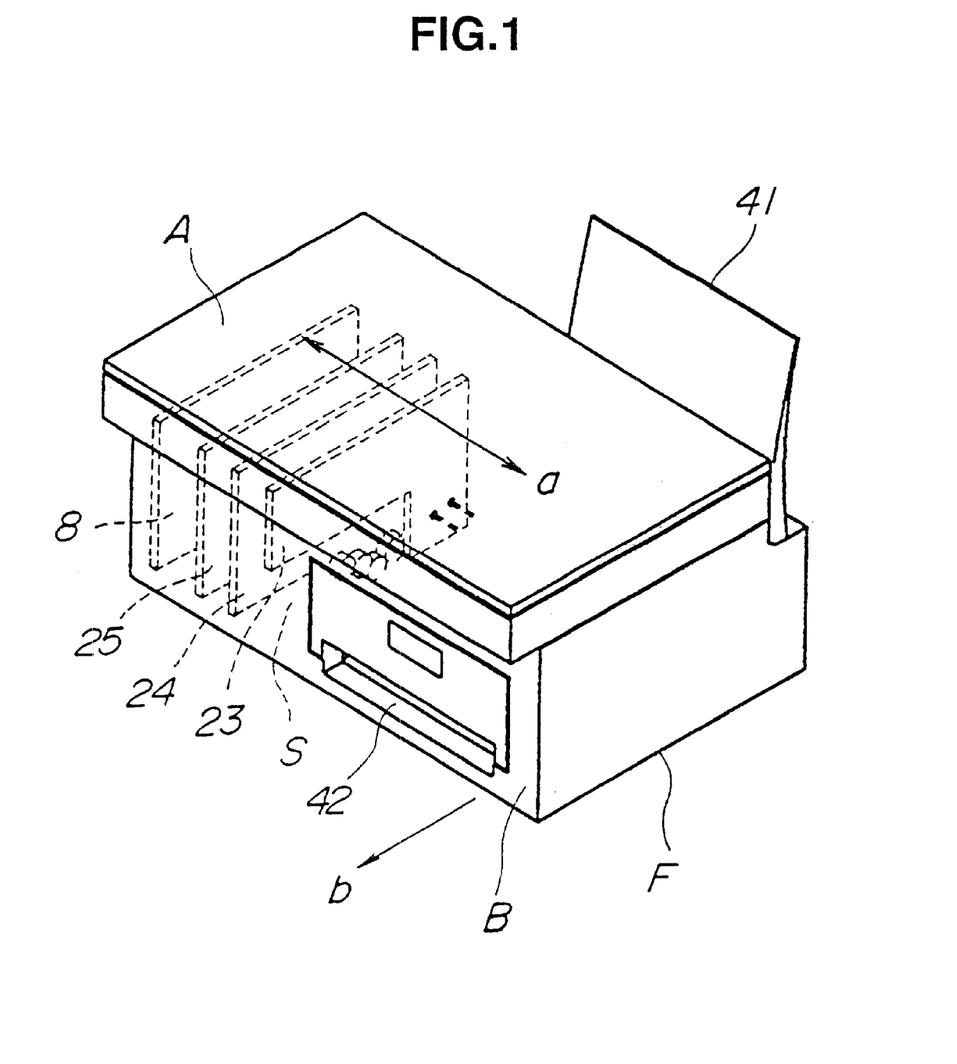
FIG. 1 is a perspective view showing the exterior appearance of an image forming apparatus according to the first embodiment of the invention.
Figure 2:
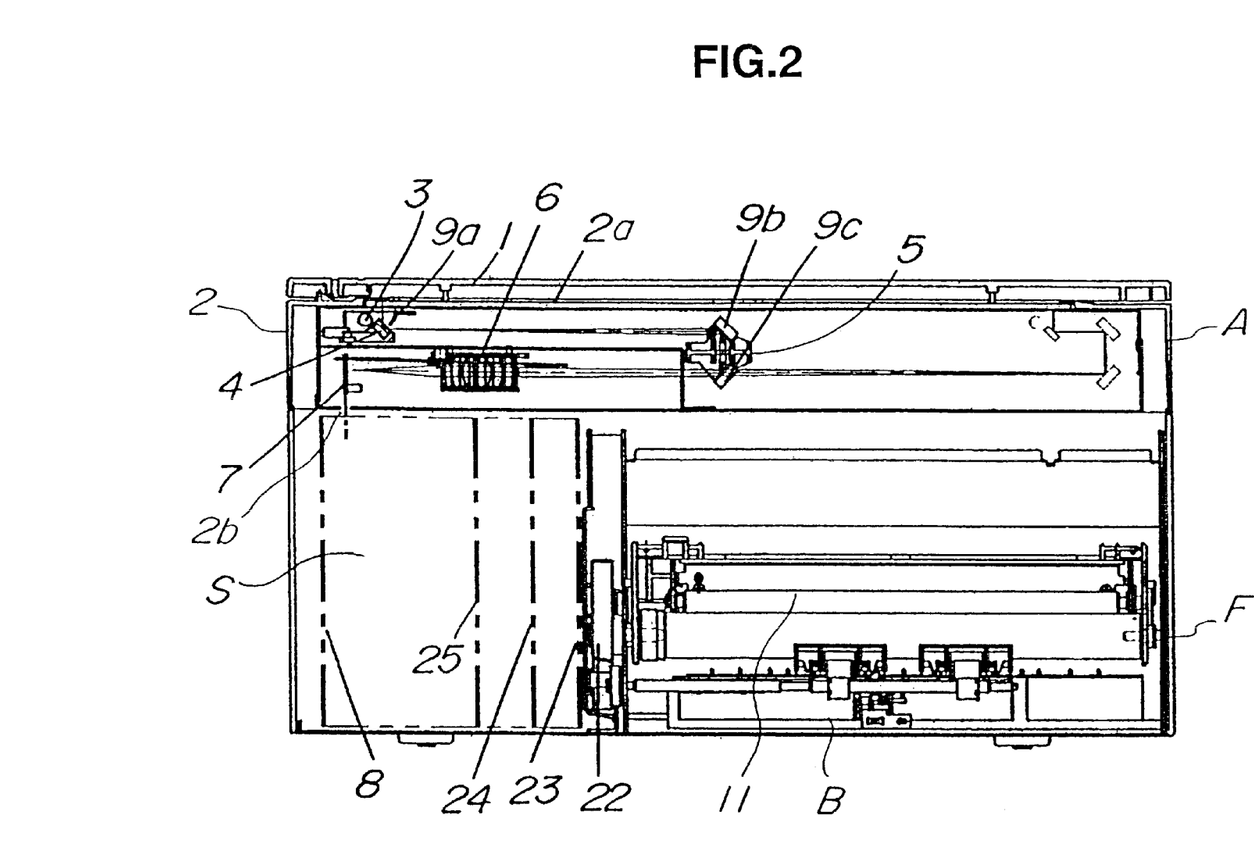
FIG. 2 is a left side view showing the image forming apparatus according to the first embodiment of the invention.
Figure 3:
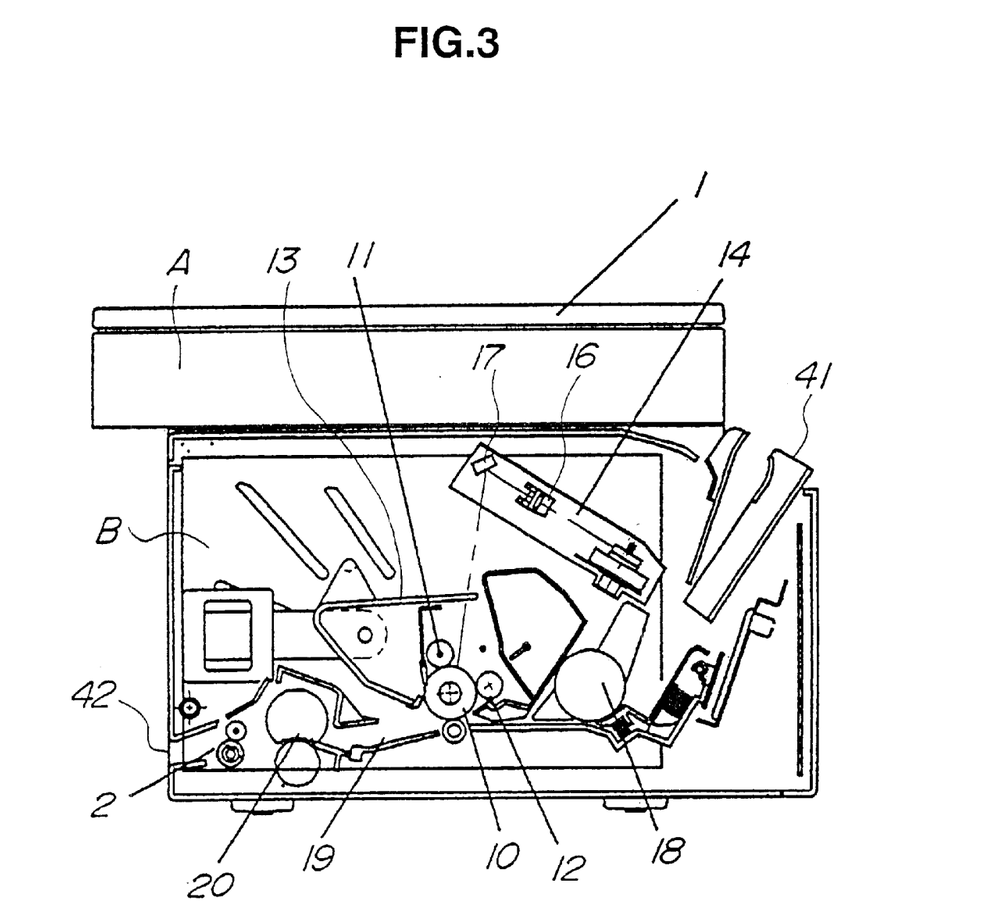
FIG. 3 is a cross-sectional view showing the image forming apparatus according to the first embodiment of the invention.
Figure 4:
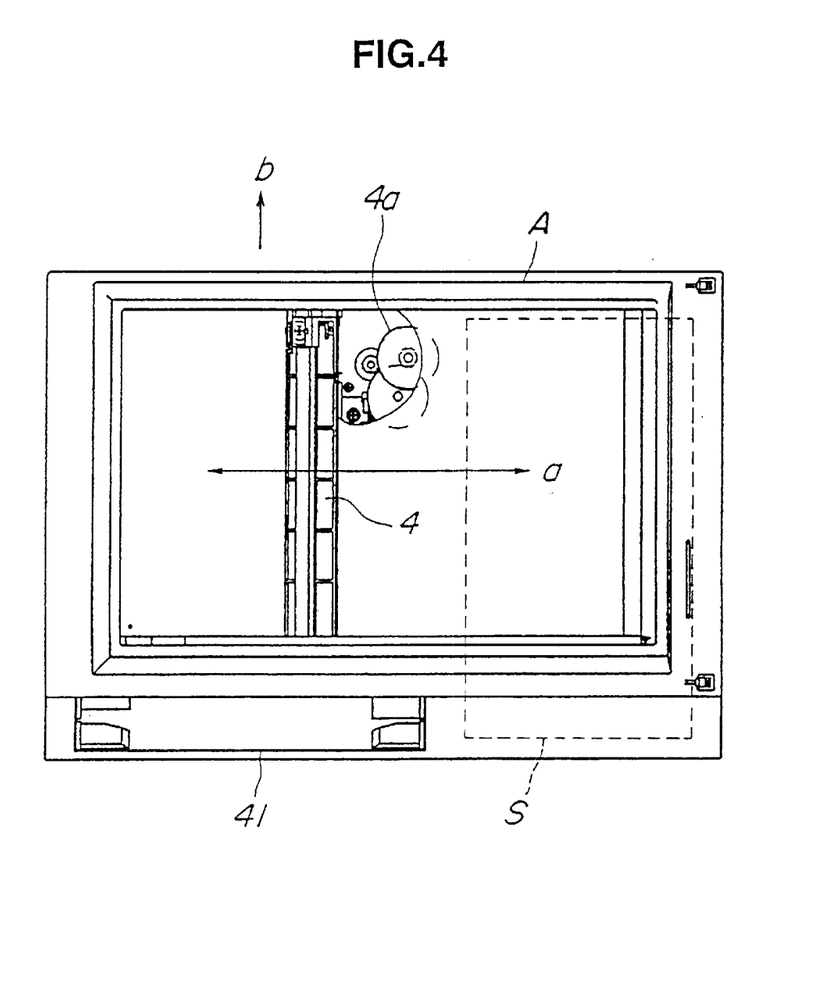
FIG. 4 is a plane view showing the image forming apparatus in a state where the original document cover is detached according to the first embodiment of the invention.

A first embodiment of the image forming apparatus will hereinafter be described with reference to FIG. 1 to FIG. 4. FIG. 1 is a perspective view showing the exterior appearance of an image forming apparatus, FIG. 2 is a left side view of FIG. 1, FIG. 3 is a cross-sectional view of FIG. 1, FIG. 4 is a top view of FIG. 1.

In respect of the image forming apparatus of this embodiment, the original document reading means A for scanning the original document on the upper portion of the apparatus body and for reading scanned information is arranged as shown in FIG. 1. The direction of the arrow a in FIG. 1 is the longitudinal direction of the original document, and matches with the scanning direction of the original document scanning section for optically scanning and reading the original document. The image forming means conveys the recording medium in the direction of the arrow b, and is arranged to perpendicularly intersect with the scanning direction of the said scanning section.

(Original Document Reading Means)

The structure of original document reading means A will hereinafter be described with reference to FIG. 2. The original document reading means includes an original document table cover 1, a casing 2 having an original document table glass 2a on the top portion, an original illumination lamp 3 arranged inside the casing 2, a first mirror table 4 which is to become the original document scanning portion, a second mirror table 5, a lens 6, a CCD 7, an image processing board for image processing 8 (hereinafter referred to as "IP board"). Owing to a driving mechanism 4a as shown in FIG. 4, the original illumination lamp 3 and the first mirror table 4 scan the original document on the original document table glass 9a in the longitudinal direction a of the original document reading means A, in which the scanning speed is twice the time faster compared to the second mirror table 5. 9a, 9b, 9c are scanning mirrors.

In accordance with the scanning by the original document scanning section, the original document placed on the original document table glass 2 is exposed by the lamp 3, thus reflected light is transmitted through the lens 6 via the mirrors 9a to 9c, the reflecting light of the reading image is converted into electric signals by the CCD 7. Then, through the IP board 8, the image data is turned into optical signals by the laser scanner unit 14 and then outputted.

(Image Forming Means)

Next, with reference to FIG. 3, the structure of image forming means B will hereinafter be described mainly regarding the image forming operation, The image forming means B is arranged below the original document reading means A, and is provided with a photo sensitive drum 10 serving as a rotative supporting image carrier. Located above the photosensitive drum 10 is a primary charging means 11 which charges uniformly. This embodiment is described in the roller charging method in where a high voltage is applied to a rotative member having a high resistant conducting layer on the surface which contacts to the drum 10. Nevertheless, other methods as the corona charging method can be used as well. A developing means 12 is arranged at the right of the photosensitive drum 10. With the rotation of the developing means 12, a toner is applied to the electro static latent on the photosensitive drum 10 and developing is performed at the position facing the photosensitive drum 10. The photosensitive drum 10 and the primary charging means 11 and the developing means 12 is formed as a united body and is structured as a process cartridge 13.

A laser scanner unit 14 is arranged above the processing cartridge 13 This laser scanner unit 14 has a collimator lens and a cylindrical lens which are the optical elements guiding a luminously emitted laser and a semiconductor laser for laser luminous means (not shown in drawings) to a rotatively scanning polygon mirror 15. The laser scanned by the rotating polygon mirror passes through the toric lens and f-θ lens 16, and reaches the photosensitive drum 10 inside the process cartridge 13 via the curving mirror 17 for bending the laser to a predetermined direction; which then result to exposure.

Due to thus exposure, an electro static latent is formed, and is visualized as a toner image by the developing apparatus, By the transferring of the toner image to the recording medium which is conveyed by the conveying roller 18, the original document image is reproduced on the recording medium. Furthermore, the recording medium is loaded on the sheet feeding tray 41, and is sent to the recording section comprising such as the photosensitive drum 10 by the conveying roller 18. Following the transfer, the recording medium reaches a fixing means 20 after passing through the conveying guide 19. When the toner image is fixed, the image forming process is completed, and then the recording medium is discharged from the apparatus out from the exhaustion outlet 42 by an exhaust roller 21.

(Relationship Regarding the Arrangement of the Original Document Reading Means and the Image Forming Means)

Next, the relationship regarding the arrangement of the original document reading means and the image forming means will hereinafter be specifically described with reference to FIG. 1 and FIG. 2.

The image forming means B is arranged to a predetermined position inside a frame F with an image forming means A placed on top. Although, the longitudinal measurements of the photosensitive drum 10 constituting part of the structure of the image forming means is slightly longer compared to the width of the recording medium (the measurement in the direction perpendicularly intersecting with the conveying direction); with this embodiment, the comprising elements such as the body chassis or a cartridge included therein are arranged in a manner in which the one edge of the photosensitive drum 10 in the longitudinal direction is adjacent to the outer surface as much as possible. Accordingly, as shown in FIG. 2, the image forming means is one-sidedly arranged to the right side edge so that the side edge of the scanning home position (the right side edge in FIG. 2) of the scanning section of the original document reading means A is substantially conforming to the one edge of the width of the recording medium of the image forming means.

Due to this structures a space S can be obtained at the bottom portion on the opposite side of the original document reading means A (hereinafter referred to as "one-sided space"). In thus one-sided space, assorted arranging boards and a driving means can be effectively equipped.

In other words, the measurements of the original document reading means in the longitudinal direction is that of the measurements of the original document +α, and the width of the image forming means B (photosensitive drum 10) is that of the width of the sheet (recording medium) +α. If the size of the original document and the recording medium is made into an equivalent size (e.g. A4 size sheet), as this embodiment, by arranging the conveying direction of the recording medium b of the image forming means B in a manner which perpendicularly intersects with the longitudinal direction a of original document reading means A, the remaining space from the subtracted length and width of the original document (recording medium) can be made to use, and by one-sidedly arranging the image forming means B, the one-sided space S can be obtained.

Furthermore, as shown in FIG. 2, a drive system 22 is arranged to the area adjacent to image forming means B. In thus area, next to the drive system is a power terminal to respectively supply bias voltage for the primary charger, development, transference in which are directly connected to a high voltage generating circuit board 23, and at the same time, the photosensitive drum 10 and developing means are also arranged to contact with the said power terminal. Furthermore, a DC controller is placed parallel to the high voltage generating circuit board 23. The control for the respective portions regarding image forming operation such as the temperature fixing control, the laser output, the primary charger, the transfer charger and the like, the element control e.g. driving clutch of the motor, are performed at this DC controller 24.

In addition, as shown on the left side of FIG. 2, the system controller board 25 is arranged adjacent to the DC controller 25. At this section, the control of the entire system is performed including the control of the information sent from the external apparatus such as personal computers and the like. As shown in FIG. 2, an IP board 8 is arranged also adjacent to the system controller board 25. When functioning as a copying machine, the image processing of electric signals based on the image information outputted from the original document reading means A. Furthermore, an opening 26 is formed at a portion of the bottom surface of the casing 2 of the original document reading means A, and at thus lower portion, the IP board 8 is connected in a manner directly connecting to the CCD 7. Accordingly, the onboard connecting can be accomplished without the use of flexible cables.

Conventionally, the assorted arranging boards had to be scatteringly arranged inside the apparatus body; nevertheless, with thus structure, by effectively obtaining space at the lower portion of original document reading means, the assorted arranging boards could be vertically placed in a concentrated arrangement. By thus concentrated arrangement, the respective boards can be onboard connected, and would reduce the use of cables and accessory connecters. In addition, the concentrated arrangement makes possible a concentrated heat exhaustion of a single heat exhaustion means.

By setting the home position of the mirror table of the original document reading means at the same side of the CCD (the opposite of the one-sided arranged image forming means) as shown in FIG. 2, and by arranging the optic scanning motor on the same side, the cables for the respective electrical elements of original document reading means A can be reduce or withdrawn.

Second Embodiment

Figure 5:
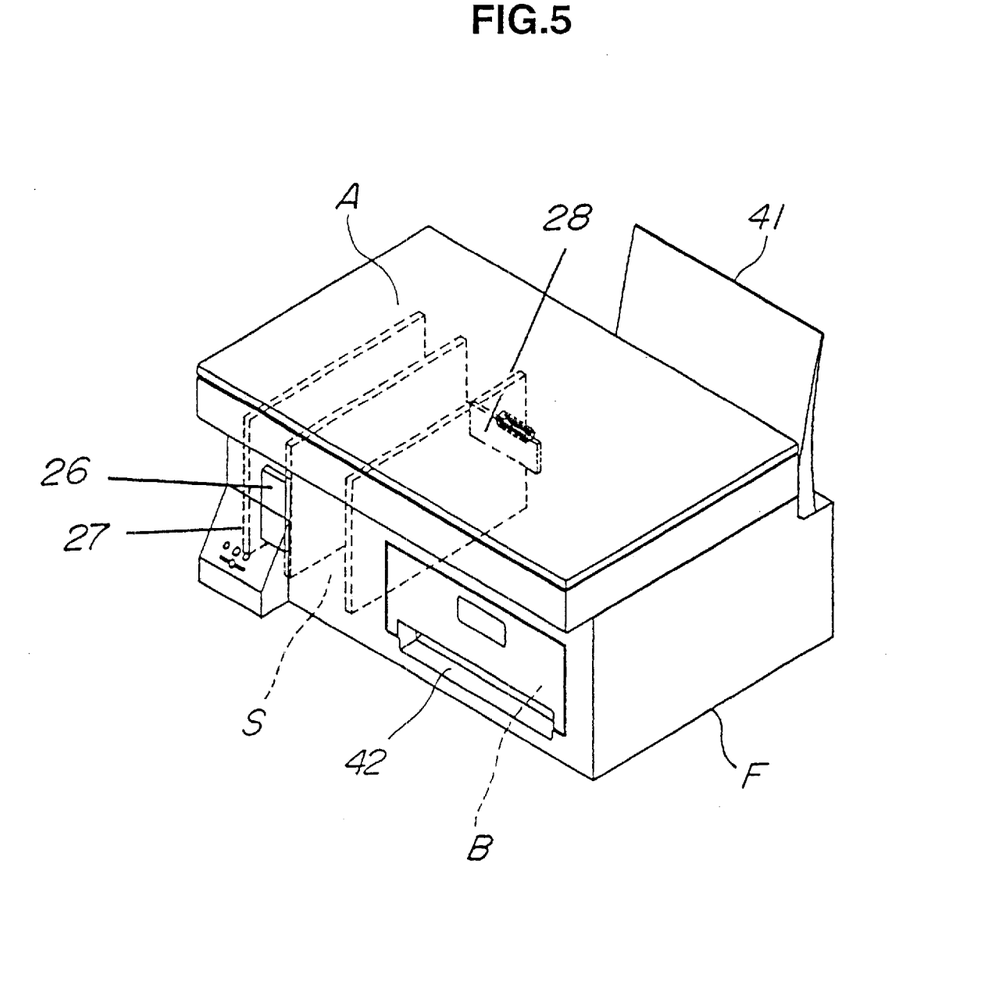
FIG. 5 is a perspective view showing an image forming apparatus according to the second embodiment of the invention.

Next, the second embodiment of the image forming apparatus will hereinafter be described with reference to FIG. 5. FIG. 5 is a perspective view showing the exterior appearance of an image forming apparatus, and the same numbers are marked in respect of the members having the same functions as the first embodiment.

Although the image forming apparatus regarding this embodiment is of the same structure as that of the first embodiment, a control section board 26 is disposed at the one-sided space inside of the frame F in which the said space is created by the one-sided arranging of the image forming apparatus B. By thus arranging the control section board 26 in the one-sided space, a control section panel 27 can be attached as shown in FIG. 5. By making thus arrangement possible, the control section panel can be attached in a manner which would not effect the outer measurements of the main body, and enables the saving of space.

The structure of this embodiment is effective not only for the control section, but also for the attachment of a variety of interface boards 28.

Third Embodiment

Figure 6:
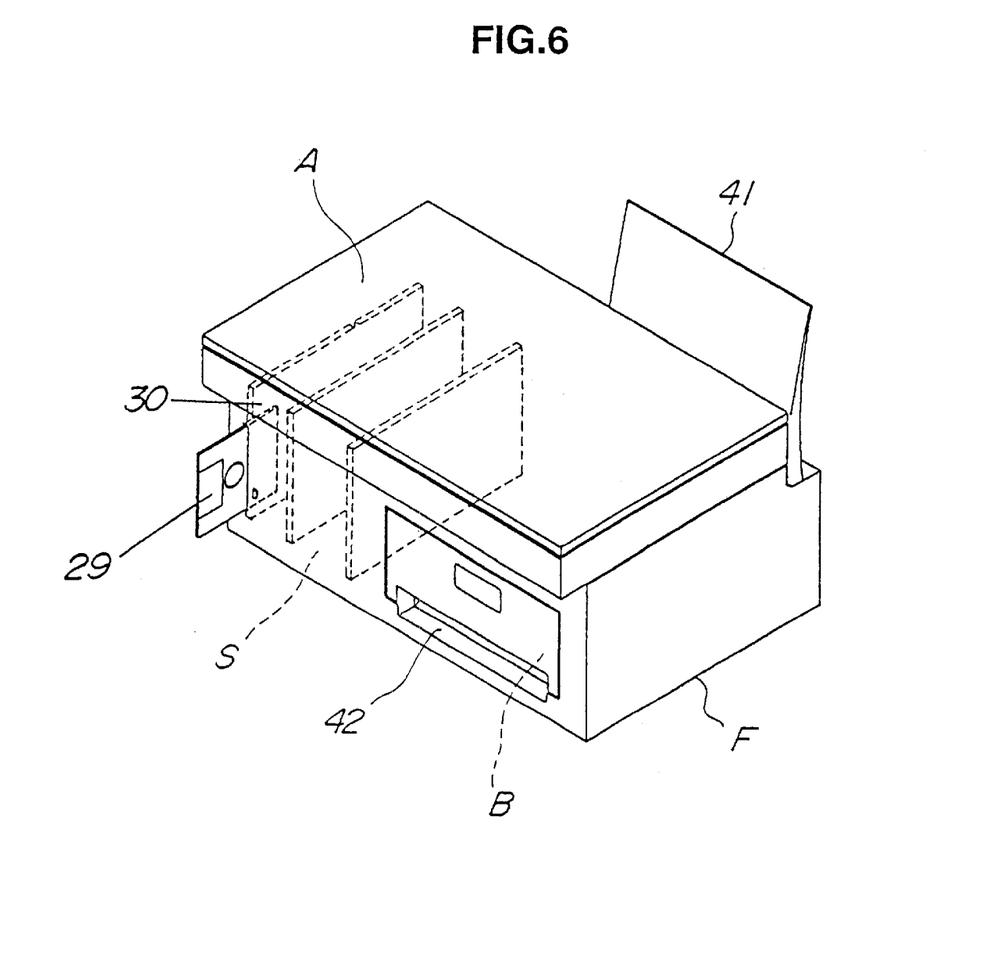
FIG. 6 is a perspective view showing an image forming apparatus according to the third embodiment of the invention.

Next, the third embodiment of the image forming apparatus will hereinafter be described with reference to FIG. 6. FIG. 6 is a perspective view showing the exterior appearance of an image forming apparatus, and the same numbers are marked in respect of the members having the same functions as the first embodiment, Although the image forming apparatus regarding this embodiment is of the same structure as that of the first embodiment, additional functions can be arranged to the useful space created by the concentrative arranging of the boards to the one-sided space inside the frame F. For example, as shown in FIG. 6, a floppy disc driver 30 for reading and writing a floppy disc (hereinafter referred to as "FD") 29 as an electronic file can be built to the apparatus.

Accordingly, the image information read from the original document reading means A can be memorized on the FD 29 at the same time the said information is sent to a personal computer. Needless saying, that a magneto-optical disc drive for memory storage or readers for the exterior recording media e.g. memory chips can be built.

In respect of this embodiment, due to the vertical layering arrangement of the various arranging boards in the space obtained by the one-sided arrangement of the image forming means with a structure in which the original document scanning direction substantially intersects perpendicular to the conveying direction of the recording means, the function components can be more efficiently added than the conventional structure without making the outer shape larger.

More particularly, since the respective boards can be arranged in a concentrated manner, the connecting of the cables would become simplified, and though having the same outer body, more supplementary function boards can be arranged.

Furthermore, due to the structure in which the controller and power board are arranged directly below the lens of the original document means, a heat is generated from thus arranging boards, and in consequence, a dew condensation prevention effect regarding the lens is confirmed. Especially, in respect of multi-function machines with a printer function or a fax function, since the said machines need to be always in a waiting mode, the power circuits would not be in the state where the electrical power is completely shut down.

Accordingly, the dew condensation prevention from the heat generated front thus state will result to the heightening of performance.

On the other hand, by forming the original document reading means at the bottom surface, an air flow created by the scanning of the mirror table would circulate to the side of the arranging boards through the opening 2a for connecting the arrangings. This enables the creation of a strong air flow during continuous copying, and would result to the cooling effect for the heated arrangings especially during continuous use.

Since this invention is thus structured, the space except for the space taken up by the image forming means arranged below the reading means can be effectively obtained, and since the obtained space is of sufficient capacity, the attachment of useful boards and the like is made possible. Consequently, the adding of supplementary functions can be accomplished without making the apparatus layout larger.

What is claimed is:

1. An image forming apparatus comprising:
   a reading unit for reading an original document mounted thereon by moving a scanning optical system in an original document scanning direction; and
   an image forming unit arranged below said reading unit for forming an image on a recording medium corresponding to image information obtained by said reading unit reading the original document,
   wherein said image forming unit is arranged in a first space at one side in the original document scanning direction of said reading unit and an electrical board is vertically disposed in a second space opposite the first space below said reading unit in a crossing direction to the original document scanning direction.

2. The image forming apparatus according to claim 1, wherein in the second space, a plurality of electrical boards are disposed nearly parallel to each other in an overlapping manner.

3. The image forming apparatus according to claim 1, wherein a conveying direction of the recording medium in the image forming unit intersects with the original document scanning direction of said reading unit.

4. The image forming apparatus according to claim 1, wherein the one side in the original document scanning direction of said reading unit at which said image forming unit is arranged is on a side of a home position of the scanning optical system.

5. The image forming apparatus according to claim 2, wherein said reading unit comprises a converting element for converting a scanned image into electric signals, and wherein the converting element is arranged opposite the one side in the original document scanning direction of said reading unit and is positioned adjacent to the plurality of electrical boards.

6. The image forming apparatus according to claim 1, wherein the electrical board is arranged perpendicular to the original document scanning direction.

7. An image forming apparatus comprising:
   an original document reading unit having an image scanning section, for optically reading images of an original document by moving the image scanning section in a longitudinal direction;
   an image forming unit which conveys a recording medium in a direction intersecting to the longitudinal direction of the image scanning section and makes a recording corresponding to image information read by said original document reading unit; and
   an arranging board for processing the image information from said original document reading unit or for controlling said original document reading unit and said image forming unit,
   wherein said image forming unit is arranged below said original document reading unit and is arranged to one side of said original document reading unit in the longitudinal direction, and wherein said arranging board is arranged below said original document reading unit and is arranged to the other side of said original document reading unit in the longitudinal direction, which is adjacent to said image forming unit.

8. The image forming apparatus according to claim 7, wherein said original document reading unit comprises a converting element for converting scanned images into electrical signals, and wherein the converting element is arranged to the other side of said original document reading unit in the longitudinal direction and is positioned adjacent to said arranging board.

* * * * *